United States Patent
Li et al.

(10) Patent No.: US 8,514,557 B2
(45) Date of Patent: Aug. 20, 2013

(54) SUPPORT MECHANISM AND ELECTRONIC DEVICE USING THE SAME

(75) Inventors: Xiao-Bo Li, Shenzhen (CN); Jian Li, Shenzhen (CN); Liang Wei, Shenzhen (CN)

(73) Assignees: Hong Fu Jin Precision Industry (ShenZhen) Co., Ltd., Shenzhen (CN); Hon Hai Precision Industry Co., Ltd., New Taipei (TW)

( * ) Notice: Subject to any disclaimer, the term of this patent is extended or adjusted under 35 U.S.C. 154(b) by 194 days.

(21) Appl. No.: 13/156,508

(22) Filed: Jun. 9, 2011

(65) Prior Publication Data
US 2012/0106040 A1 May 3, 2012

(30) Foreign Application Priority Data
Oct. 28, 2010 (CN) .................... 2010 1 0523113.1

(51) Int. Cl.
*G06F 1/16* (2006.01)
(52) U.S. Cl.
USPC ............ 361/679.22; 361/679.01; 361/679.02; 361/679.21; 312/223.1; 312/223.2; 16/221; 16/223; 16/312
(58) Field of Classification Search
USPC ...................................... 361/679.59; 40/748
See application file for complete search history.

(56) References Cited

U.S. PATENT DOCUMENTS

| | | | |
|---|---|---|---|
| 7,295,429 B2 * | 11/2007 | Jackson, Jr. | 361/679.27 |
| 7,916,478 B2 * | 3/2011 | Tu et al. | 361/679.59 |
| 8,201,687 B2 * | 6/2012 | Zeliff et al. | 206/320 |
| 2005/0052831 A1 * | 3/2005 | Chen | 361/680 |
| 2007/0062089 A1 * | 3/2007 | Homer et al. | 40/754 |
| 2009/0119965 A1 * | 5/2009 | Broehl et al. | 40/721 |
| 2009/0175133 A1 * | 7/2009 | Jiang | 368/30 |
| 2009/0320243 A1 * | 12/2009 | Wang et al. | 16/303 |
| 2010/0002379 A1 * | 1/2010 | Hadad et al. | 361/679.59 |
| 2011/0182007 A1 * | 7/2011 | Zhu et al. | 361/679.01 |

FOREIGN PATENT DOCUMENTS

| | | |
|---|---|---|
| CN | 1342984 A | 4/2002 |
| CN | 101056513 A | 10/2007 |

* cited by examiner

*Primary Examiner* — Anthony Q Edwards
(74) *Attorney, Agent, or Firm* — Altis Law Group, Inc.

(57) ABSTRACT

A support mechanism includes a support frame, a first hinge assembly, and a second hinge assembly. The support frame includes a first pivoting portion and a second pivoting portion aligned with the first pivoting portion. The first hinge assembly is mounted to the first pivoting portion, and the second hinge assembly is mounted to the second pivoting portion and aligns with the first hinge assembly. The support mechanism is durable. The present disclosure further provides an electronic device using the support mechanism. As the first pivot portion and the first hinge assembly is arranged in a line coaxial with the second pivoting portion and the second hinge assembly, an amount of force applied for supporting the main body of the electronic device is dispersed in a line, rather than being focused on one point, such that, an adjustable viewing angle to the main body is also provided.

18 Claims, 7 Drawing Sheets

SUPPORT MECHANISM AND ELECTRONIC DEVICE USING THE SAME

BACKGROUND

1. Technical Field

This disclosure relates to support mechanisms, and more particularly, to a support mechanism and an electronic device using the support mechanism.

2. Description of Related Art

An electronic device, such as a digital album or a digital photo frame, often has a display screen and a support mechanism for supporting the display screen, and adjusting an inclination angle of the display screen. A commonly used support mechanism is a support rod hinged to the back surface of the display screen. In use, an inclination angle of the display screen relative to a plane of a table can be adjusted by operating the support rod.

However, the commonly used support rod often has a slim structure, thus the hinged portion of the support rod and the display screen are easily worn after frequent use. In addition, the commonly used support mechanism does not provide support as well as it should.

Therefore, there is room for improvement in the art.

BRIEF DESCRIPTION OF THE DRAWINGS

Many aspects of the embodiments can be better understood with reference to the following drawings. The components in the drawings are not necessarily drawn to scale, the emphasis instead being placed upon clearly illustrating the present disclosure. Moreover, in the drawings like reference numerals designate corresponding parts throughout the several views. Wherever possible, the same reference numerals are used throughout the drawings to refer to the same or like elements of an embodiment.

DETAILED DESCRIPTION

Figure 1:
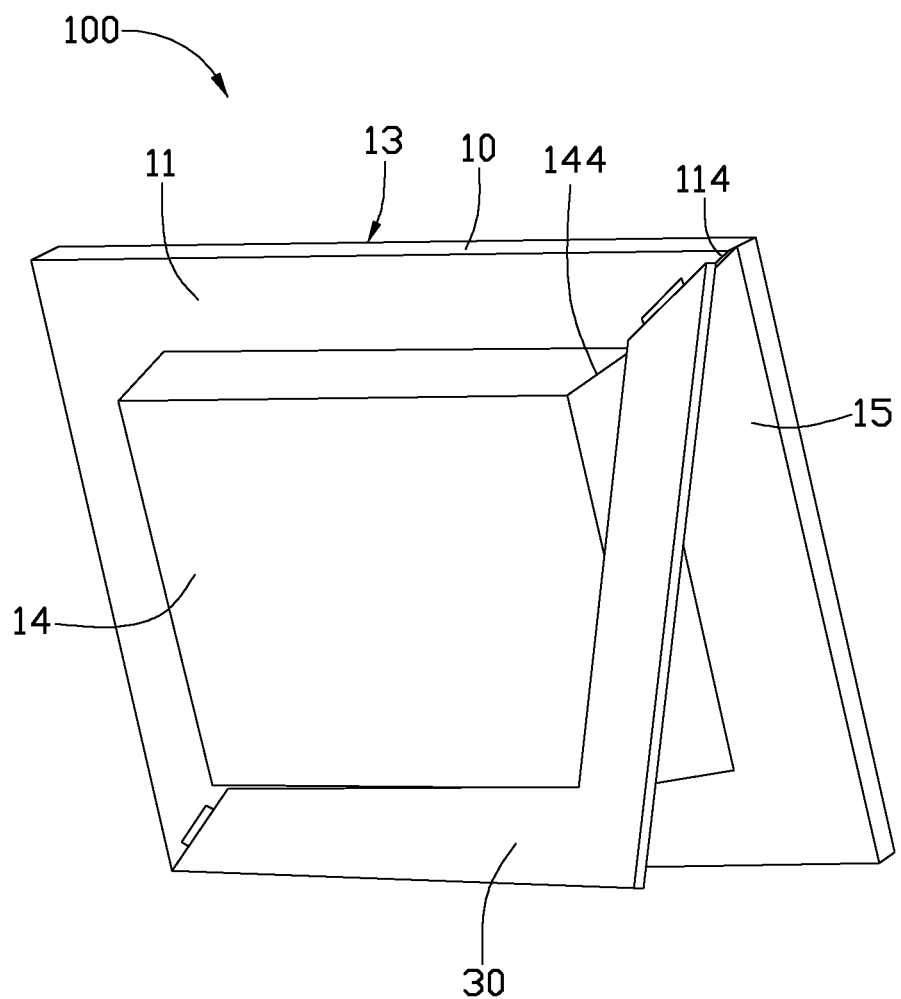
FIG. 1 is an assembled, isometric view of an embodiment of an electronic device equipped with a support mechanism.
Figure 2:
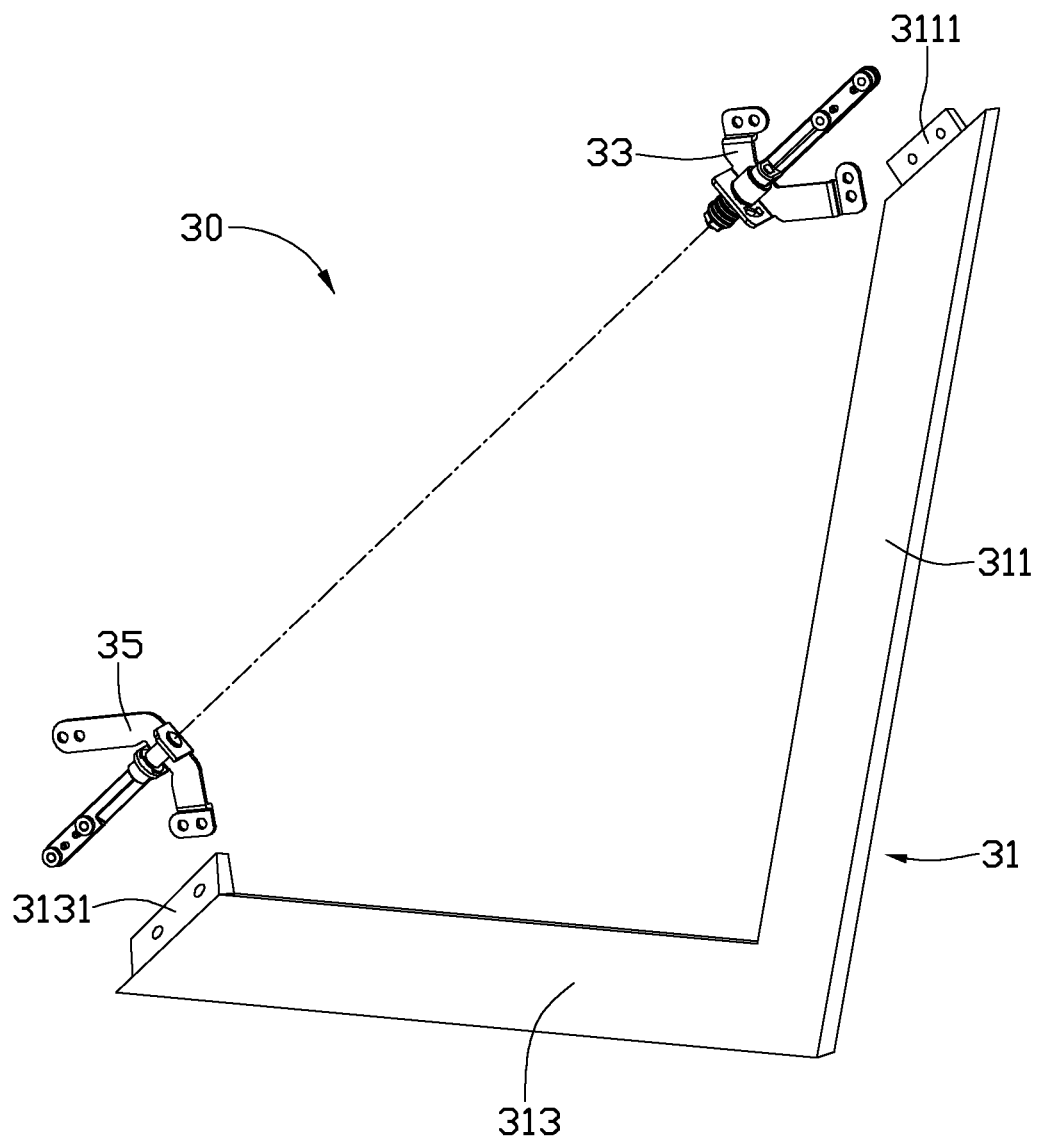
FIG. 2 is an exploded, isometric view of the support mechanism of the electronic device, wherein, the support mechanism includes a support frame, a first hinge assembly, and a second hinge assembly.

Referring to FIGS. 1 and 2, an embodiment of an electronic device 100 includes a main body 10 and a support mechanism 30 hinged to the main body 10.

The main body 10 is substantially rectangular, and includes a back support surface 11, and a front display surface 13 opposite to the back support surface 11. A convex portion 14 protrudes from a substantially middle portion of the back support surface 11. A concave portion 15 is recessed from the back support surface 11, for receiving the support mechanism 30, when the support mechanism 30 is unused. The concave portion 15 is positioned adjacent to a periphery of the back support surface 11 of the main body 10, and surrounds the convex portion 14. In the illustrated embodiment, the electronic device 100 is a digital album or a digital photo frame. The main body 10 is a substantially rectangular display screen of the electronic device 100. The convex portion 14 is also substantially rectangular and has four corners 144. The concave portion 15 is substantially L-shaped and is recessed from the back support surface 11. The concave portion 15 partially surrounds the rectangular convex portion 14 from one diagonal corner 144 to the opposite other diagonal corner 144 of the convex portion 14. The support mechanism 30 is substantially L-shaped corresponding to the concave portion 15 of the main body 10.

The support mechanism 30 is hinged to the back support surface 11 of the main body 10, for supporting the main body 10 at a preset preferred viewing angle for use. In the illustrated embodiment, two ends of the support mechanism 30 are respectively hinged to two diagonal portions 114 of the back support surface 11 of the main body 10, and respectively positioned adjacent to two diagonal corners 144 of the convex portion 14. The support mechanism 30 includes a support frame 31, a first hinge assembly 33, and a second hinge assembly 35. The first and second hinge assemblies 33, 35, adjustably connect the support frame 31 to the main body 10. The support frame 31 is a substantially L-shaped frame, and includes a resisting portion 311 and a support portion 313 substantially perpendicularly connecting with the resisting portion 311. A first pivoting portion 3111 is defined at a distal end of the resisting portion 311 away from the support portion 313. A second pivoting portion 3131 is defined at a distal end of the support portion 313 opposite to the first pivoting portion 3111, and is positioned away from the resisting portion 311. The support frame 31 has a shape substantially the same as the concave portion 15, such that, the support frame 31 is wholly received within the concave portion 15 of the main body 10 when in an unused state, and a surface of the support frame 31 is parallel to the back support surface 11 of the main body 10.

Figure 3:
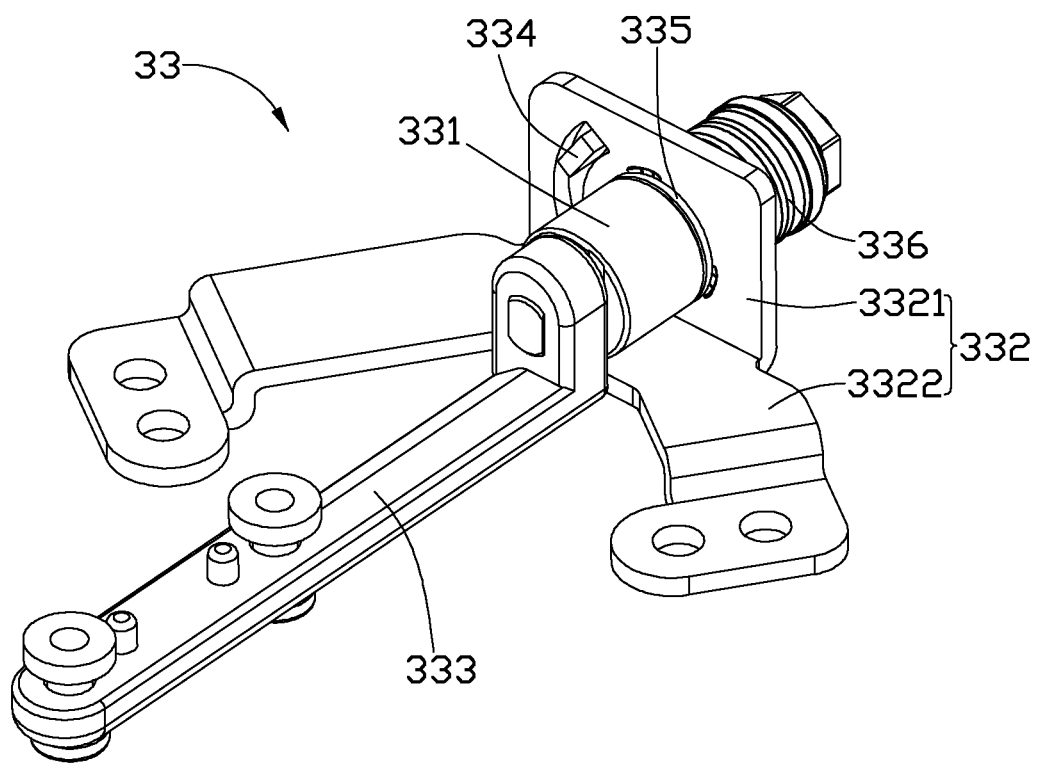
FIG. 3 is an isometric view of the first hinge assembly of the support mechanism of FIG. 2, wherein, the first hinge assembly includes a pivot shaft, a pivoting member, a connecting member, a cam, a friction piece, and a fastening module.
Figure 4:
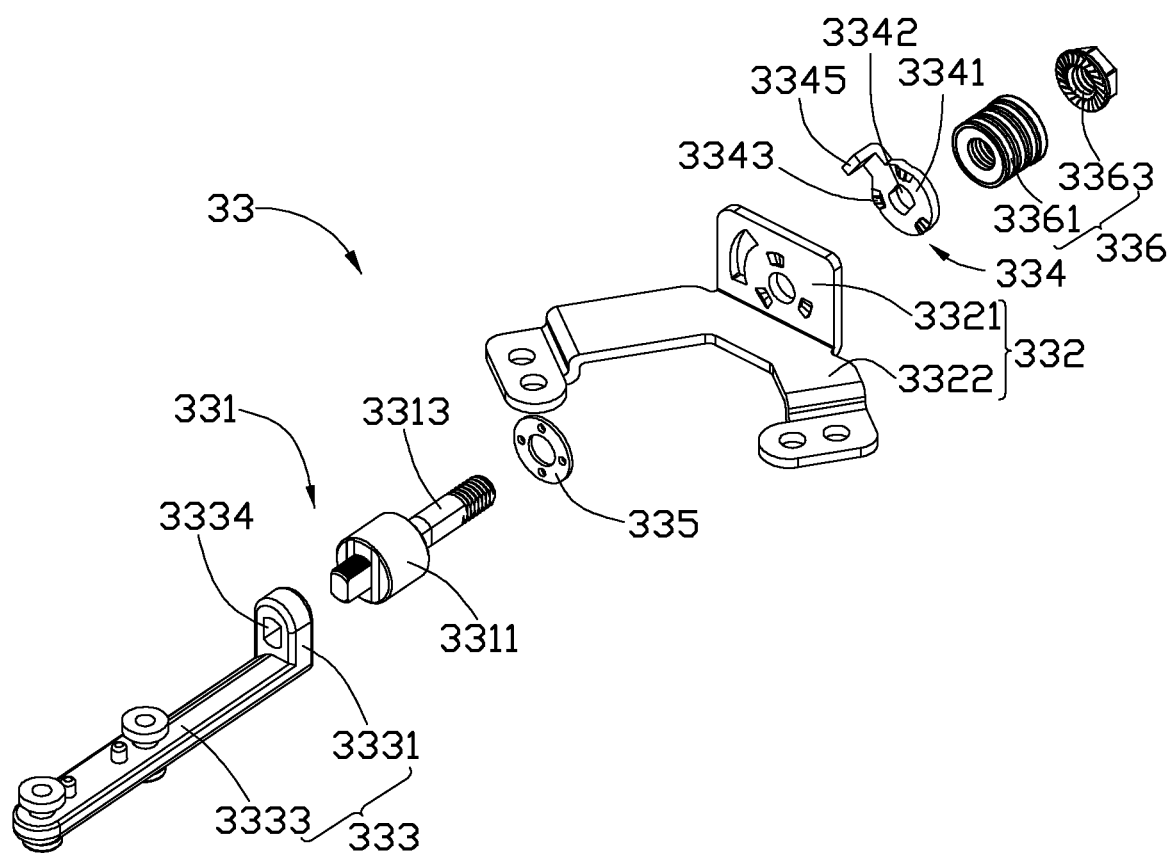
FIG. 4 is an exploded, isometric view of the first hinge assembly of FIG. 3.
Figure 5:
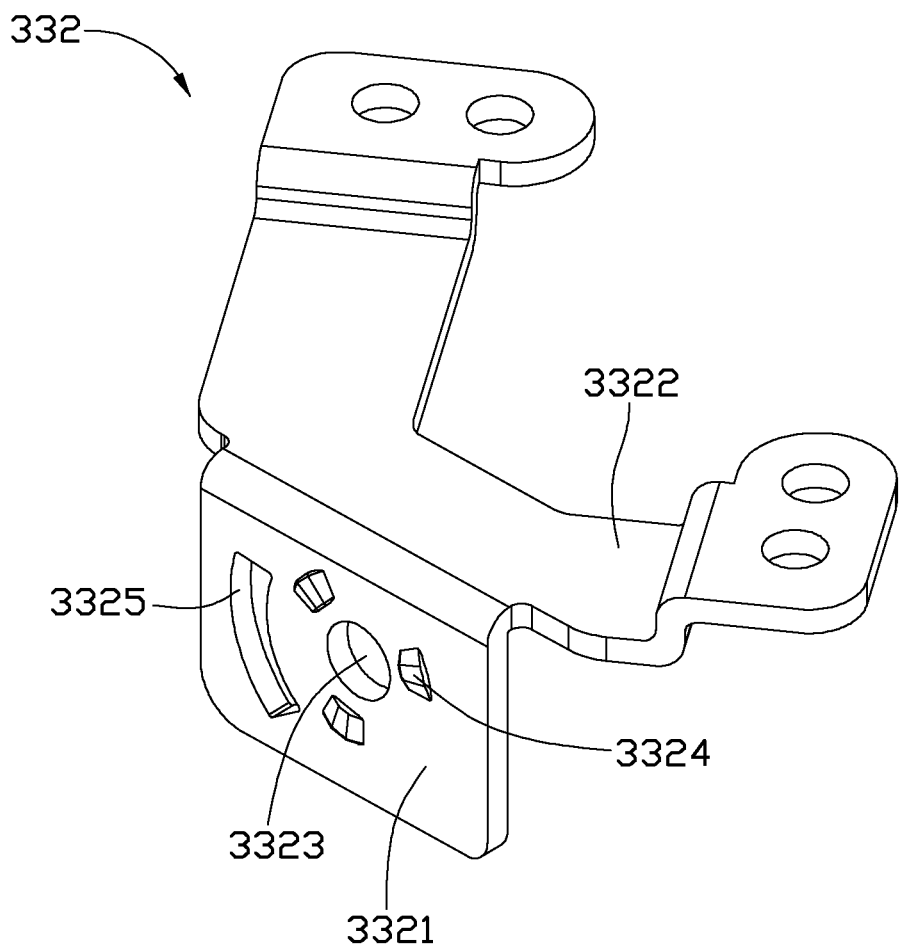
FIG. 5 is an isometric view of the pivoting member of the first hinge assembly of FIG. 4.

Also referring to FIGS. 3 through 5, the first hinge assembly 33 includes a pivot shaft 331, a pivoting member 332 rotatably sleeved on the pivot shaft 331, a connecting member 333 sleeved on the pivot shaft 331, a cam 334, a friction washer 335, and a fastening module 336 fixed to the pivot shaft 331. The pivot shaft 331 includes a main shaft portion 3311 and two deformed shaft portions 3313 coaxially formed at two ends of the main shaft portion 3311.

The pivoting member 332 includes a sleeve portion 3321 and a fixing portion 3322 substantially perpendicularly extending from one edge of the sleeve portion 3321. A pivoting hole 3323 is defined through the sleeve portion 3321. A plurality of protrusions 3324 are separately formed on one surface of the sleeve portion 3321 for surrounding the pivoting hole 3323, and are positioned away from the fixing portion 3322. In the illustrated embodiment, the number of the protrusions 3324 is three. An arcuate guiding slot 3325 is defined through the sleeve portion 3321 and positioned adjacent to and being coaxial with the pivoting hole 3323.

The connecting member 333 is mounted to one deformed shaft portion 3313 of the pivot shaft 331 and is configured for mounting the pivot shaft 331 to the main body 10. The connecting member 333 includes a connecting portion 3331 and a fastening portion 3333 extending from one end of the connecting portion 3331. The connecting portion 3331 defines a deformed shaft hole 3334 corresponding to the deformed shaft portion 3313 of the pivot shaft 331.

The cam 334 includes a substantially disk-shaped cam body 3341 and a latching claw 3345 perpendicularly extending from a periphery of the cam body 3341. A sleeving hole 3342 is defined through the substantially central portion of the cam body 3341, corresponding to the pivoting hole 3323 of the pivoting member 332. A plurality of cam portions 3343 are formed on the cam body 3341 and surround the sleeving hole 3342. In the illustrated embodiment, the total number of the cam portions 3343 is three corresponding to the total number of the plurality of protrusions 3324 of the pivoting member 332. Alternatively, the cam portion 3343 may be a protrusion or an engaging recession.

The fastening module 336 is fixed to the distal end of the one deformed shaft portion 3313 of the pivot shaft 331. In the illustrated embodiment, the fastening module 336 includes a plurality of elastic rings 3361 and a screw fastener 3363.

When assembling the first hinge assembly 33, the connecting member 333 is non-rotatably sleeved on one deformed shaft portion 3313 of the pivot shaft 331. The friction washer 335, the pivoting member 332 and the cam 334 are sleeved on the other deformed shaft portion 3313 of the pivot shaft 331 in that order. Thus, the friction washer 335 is sandwiched between the main shaft portion 3311 and the sleeve portion 3321 of the pivoting member 332. The cam 334 engages with the corresponding sleeve portion 3321. The latching claw 3345 of the cam 334 is latched into and can move within the arcuate guiding slot 3325 of the sleeve portion 3321 of the pivoting member 332. The screw fastener 3363 together with the elastic rings 3361 is fixed to the distal end of the other deformed shaft portion 3313 of the pivot shaft 331 to finish the assembly of the first hinge assembly 33.

Figure 6:
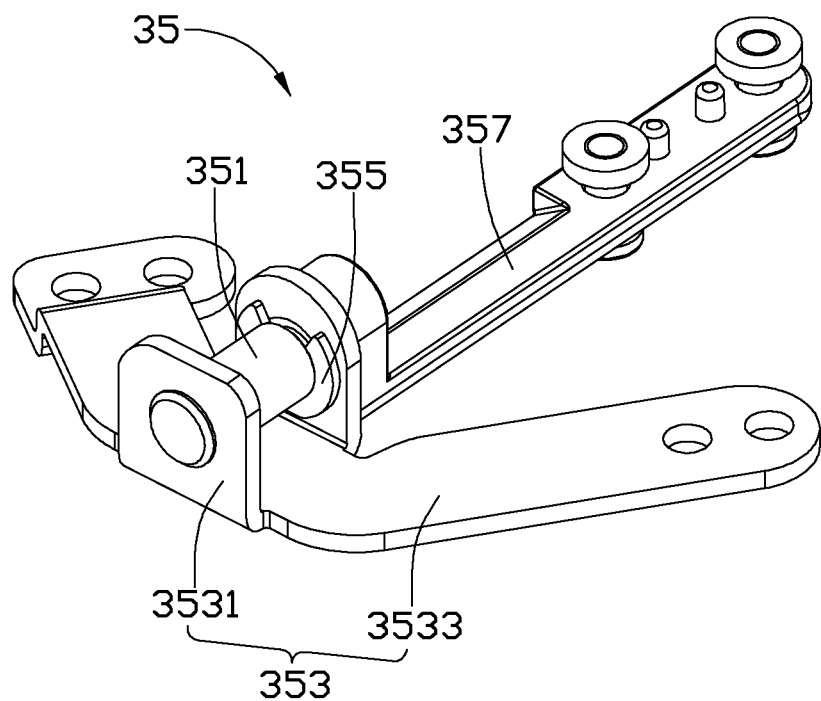
FIG. 6 is an isometric view of the second hinge assembly of FIG. 2.
Figure 7:
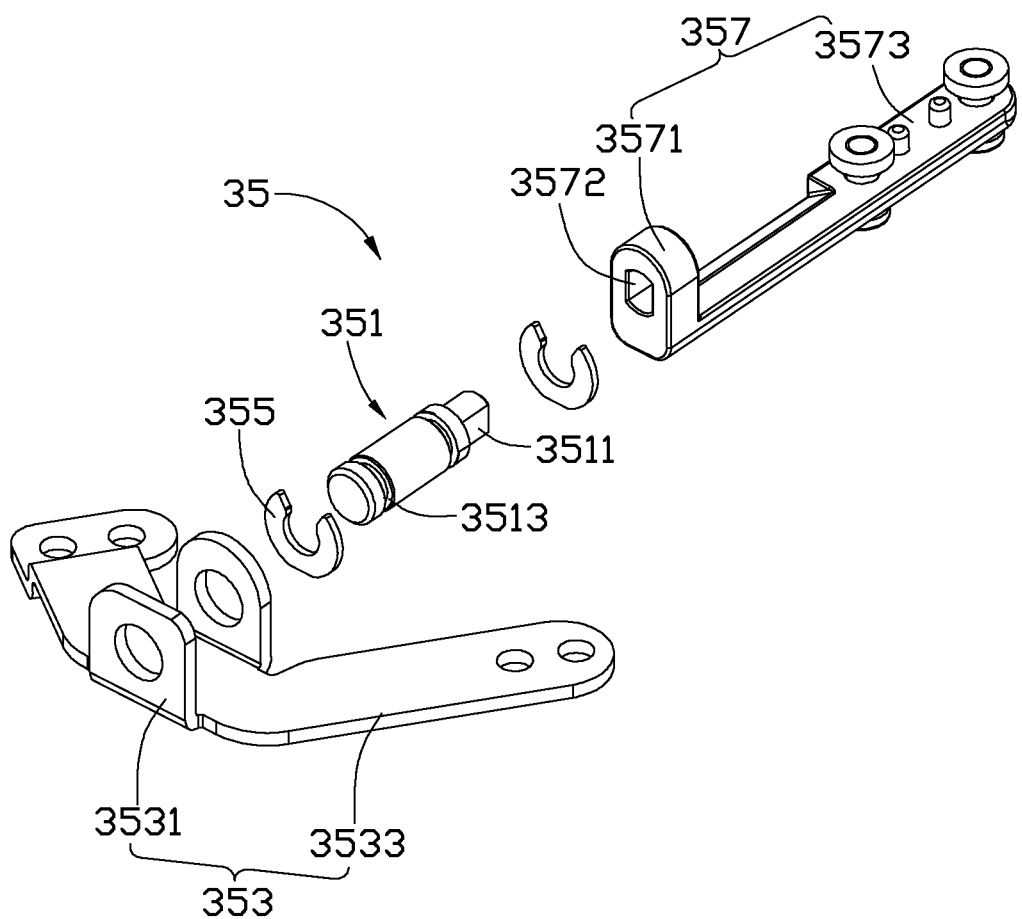
FIG. 7 is an exploded, isometric view of the second hinge assembly of FIG. 6.

Also referring to FIGS. 6 and 7, the second hinge assembly 35 includes a rotary shaft 351, a connecting piece 353, two snap rings 355, and a securing member 357. The connecting piece 353 is detachably mounted to the rotary shaft 351 with the snap ring 355. In the illustrated embodiment, two snap rings 355 are included, which are made of elastic material. The rotary shaft 351 includes a deformed shaft portion 3511 coaxially formed at one end of the rotary shaft 351, and further defines two latching slots 3513 spaced apart to each other. The connecting piece 353 includes a substantially U-shaped connecting body 3531 and two connecting arms 3533 oppositely extending out from two sides of a substantially middle portion of the connecting body 3531. The securing member 357 includes a mounting portion 3571 and a securing portion 3573 extending from one end of the mounting portion 3571. A deformed mounting hole 3572 is defined through the mounting portion 3571 corresponding to the deformed shaft portion 3511 of the rotary shaft 351. As in assembly, the securing member 357 is non-rotatably sleeved on the deformed shaft portion 3511 of the rotary shaft 351, and the connecting piece 353 is sleeved on the rotary shaft 351 and clipped by the two snap rings 355.

When assembling the support mechanism 30, the first hinge assembly 33 and the second hinge assembly 35 are oppositely mounted to the two ends of the support frame 31. The fastening portion 3333 of the connecting member 333 of the first hinge assembly 33 is fixed to the first pivoting portion 3111 of the support frame 31. The securing portion 3573 of the securing member 357 of the second hinge assembly 35 is fixed to the opposite second pivoting portion 3131 of the support frame 31, thereby finishing the assembly of the support mechanism 30. The pivot shaft 331 of the first hinge assembly 33 is configured in a line coaxial with the rotary shaft 351 of the second hinge assembly 35.

As the support mechanism 30 is fixedly applied to the electronic device 100. The fixing portion 3322 of the pivoting member 332 of the first hinge assembly 33 and the connecting arms 3533 of the connecting piece 353 of the second hinge assembly 35 are oppositely fixed to the back support surface 11 of the main body 10, such that, the support mechanism 30 is adjustably mounted to the main body 10. In the illustrated embodiment, the fixing portion 3322 of the first hinge assembly 33 and the connecting arms 3533 of the second hinge assembly 35 are oppositely fixed to the two diagonal portions 114 of the back support surface 11 of the main body 10. The support mechanism 30 can be received within the concave portion 15 of the back support surface 11 of the main body 10 when the support mechanism 30 is in an unused state.

When using the electronic device 100, the support mechanism 30 is rotated relative to the back support surface 11 of the main body 10 and is adjusted to form a preset angle relative to the main body 10 for supporting the main body 10 and obtaining a preferred viewing angle of the front display surface 13. As the first pivot portion 3111 and the pivot shaft 331 of the first hinge assembly 33 is arranged in a line coaxial with the second pivoting portion 3131 and the rotary shaft 351 of the second hinge assembly 35, an amount of force applied for supporting the main body 10 is dispersed in a line, rather than being focused on one point, such that, the stability of electronic device 100 is thereby improved and has an adjustable viewing angle to the main body 10.

It is to be understood, however, that even through numerous characteristics and advantages of the disclosure have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A support mechanism, comprising:
   a support frame comprising a first pivoting portion and a second pivoting portion aligning with the first pivoting portion, the first and second pivoting portions oppositely formed at two distal ends of the support frame;
   a first hinge assembly mounted to the first pivoting portion of the support frame;
   the first hinge assembly comprising a pivot shaft, a pivoting member rotatable sleeved on the pivot shaft, a connecting member and a cam; the connecting member non-rotatably sleeved on the pivot shaft and fixed with the first pivoting portion of the support frame; the cam mounted to the pivot shaft and engaging with the pivoting member, and
   a second hinge assembly mounted to the second pivoting portion of the support frame and aligning with the first hinge assembly.

2. The support mechanism of claim 1, wherein the support frame is substantially L-shaped, and comprises a resisting portion and a support portion substantially perpendicularly connecting with the resisting portion; the first pivoting portion is formed at a distal end of the resisting portion away from the support portion, the second pivoting portion is formed at a distal end of the support portion opposite to the first pivoting portion, and is positioned away from the resisting portion.

3. The support mechanism of claim 1, wherein the pivot shaft comprises a main shaft portion and two deformed shaft portions coaxially formed at two ends of the main shaft portion; the connecting member is non-rotatably sleeved on one deformed shaft portion of the pivot shaft, and the pivoting member and the cam are sleeved on the other deformed shaft portion of the pivot shaft in that order.

4. The support mechanism of claim 3, wherein the connecting member comprises a connecting portion and a fastening portion extending from one end of the connecting portion; the connecting portion defines a deformed shaft hole corresponding to one deformed shaft portion of the pivot shaft, and the connecting portion is non-rotatably sleeved on the corresponding deformed shaft portion of the pivot shaft via the deformed shaft hole.

5. The support mechanism of claim 3, wherein the pivoting member comprises a sleeve portion and a fixing portion, the sleeve portion defines a pivoting hole and a plurality of protrusions separately surrounding the pivoting hole; the cam comprises a cam body sleeved on the pivot shaft, the cam body defines a sleeving hole and a plurality of cam portions separately formed on the cam body and engaging with the corresponding plurality of protrusions of the pivoting member.

6. The support mechanism of claim 5, wherein the sleeve portion further defines an arcuate guiding slot positioned adjacent to and being coaxial with the pivoting hole; the cam further comprises a latching claw extending from the cam body and latching into the guiding slot of the pivoting member.

7. The support mechanism of claim 6, wherein the first hinge assembly further comprises a friction washer sleeved on the pivot shaft, the friction washer is sandwiched between the main shaft portion and the sleeve portion of the pivoting member.

8. The support mechanism of claim 7, wherein the rotary shaft comprises a deformed shaft portion coaxially formed at one end of the rotary shaft, and further defines two latching slots; the second hinge assembly further comprises two snap rings, the connecting piece is sleeved on the rotary shaft and clipped by the two snap rings.

9. The support mechanism of claim 1, wherein the second hinge assembly comprises a rotary shaft, a connecting piece, and a securing member; the connecting piece is detachably mounted to the rotary shaft; the securing member is mounted to one end of the rotary shaft and fixed to the second pivoting portion of the support frame; the pivot shaft of the first hinge assembly is aligned and coaxial with the rotary shaft of the second hinge assembly.

10. An electronic device, comprising:
a main body comprising a back support surface, and a front display surface opposite to the back support surface; and
a support mechanism adjustably connected to the back support surface of the main body for supporting the main body, the support mechanism, comprising:
a support frame comprising a first pivoting portion and a second pivoting portion aligning with the first pivoting portion, the first and second pivoting portions oppositely formed at two distal ends of the support frame;
a first hinge assembly mounted to the first pivoting portion of the support frame and the back support surface, the first hinge assembly comprising a pivot shaft, a pivoting member rotatably sleeved on the pivot shaft, a connecting member and a cam, the pivoting member connected to the back support surface of the main body, the connecting member non-rotatably sleeved on the pivot shaft and fixed with the first pivoting portion of the support frame, the cam mounted to the pivot shaft and engaging with the pivoting member; and
a second hinge assembly mounted to the second pivoting portion of the support frame and the back support surface, and aligning with the first hinge assembly.

11. The electronic device of claim 10, wherein the main body comprises a convex portion protruding from the back support surface, and a concave portion recessed from the back support surface and partially surrounding the convex portion; the support mechanism is received in the concave portion when the support mechanism is unused.

12. The electronic device of claim 11, wherein the concave portion is substantially L-shaped and partially surrounding the convex portion, the support frame is substantially L-shaped, and comprises a resisting portion and a support portion substantially perpendicularly connecting with the resisting portion; the first pivoting portion is formed at a distal end of the resisting portion away from the support portion, the second pivoting portion is formed at a distal end of the support portion opposite to the first pivoting portion, and is positioned away from the resisting portion.

13. The electronic device of claim 12, wherein the second hinge assembly comprises a rotary shaft, a connecting piece, and a securing member; the connecting piece is detachably mounted to the rotary shaft; the securing member is mounted to one end of the rotary shaft and fixed to the second pivoting portion of the support frame; the pivot shaft of the first hinge assembly is aligned and coaxial with the rotary shaft of the second hinge assembly.

14. The electronic device of claim 10, wherein the pivot shaft comprises a main shaft portion and two deformed shaft portion coaxially formed at two ends of the main shaft portion; the connecting member is non-rotatably sleeved on one deformed shaft portion of the pivot shaft, and the pivoting member and the cam are sleeved on the other deformed shaft portion of the pivot shaft in that order.

15. The electronic device of claim 14, wherein the connecting member comprises a connecting portion and a fastening portion extending from one end of the connecting portion; the connecting portion defines a deformed shaft hole corresponding to one deformed shaft portion of the pivot shaft, and the connecting portion is non-rotatably sleeved on the corresponding deformed shaft portion of the pivot shaft via the deformed shaft hole.

16. The electronic device of claim 14, wherein the pivoting member comprises a sleeve portion and a fixing portion, the sleeve portion defines a pivoting hole and a plurality of protrusions separately surrounding the pivoting hole; the cam comprises a cam body sleeved on the pivot shaft, the cam body defines a sleeving hole and a plurality of cam portions separately formed on the cam body and engaging with the corresponding plurality of protrusions of the pivoting member.

17. The electronic device of claim 16, wherein the sleeve portion further defines an arcuate guiding slot positioned adjacent to and being coaxial with the pivoting hole; the cam further comprises a latching claw extending from the cam body and latching into the guiding slot of the pivoting member.

18. The electronic device of claim 17, wherein the first hinge assembly further comprises a friction washer sleeved on the pivot shaft, and the friction washer is sandwiched between the main shaft portion and the sleeve portion of the pivoting member.

* * * * *